United States Patent [19]

Todd

[11] Patent Number: 5,010,227

[45] Date of Patent: Apr. 23, 1991

[54] SOLDERING APPARATUS AND METHOD OF USING THE SAME

[76] Inventor: Thomas W. Todd, 10515 Earthstar Ct., San Diego, Calif. 92127

[21] Appl. No.: 311,655

[22] Filed: Feb. 15, 1989

[51] Int. Cl.$^5$ .......................... B23K 1/02; B23K 11/30; H05B 3/42
[52] U.S. Cl. ................................ 219/85.16; 219/119; 219/233; 219/238
[58] Field of Search ...................... 219/85.16, 236–238, 219/241, 119, 228, 233

[56] References Cited

U.S. PATENT DOCUMENTS

| | | | |
|---|---|---|---|
| 3,136,878 | 6/1964 | Staller | 219/239 |
| 3,230,338 | 1/1966 | Kawecki | 219/238 X |
| 3,271,555 | 9/1966 | Hirshon et al. | 219/85.16 |
| 3,316,385 | 4/1967 | Anton | 219/236 |
| 3,410,472 | 11/1968 | Weller et al. | 219/239 X |
| 3,576,969 | 5/1971 | Surty et al. | 219/85.16 X |
| 3,786,228 | 1/1974 | Castellana et al. | 219/233 |
| 3,811,030 | 5/1974 | Yeach | 219/237 |
| 4,035,613 | 7/1977 | Sagawa et al. | 219/238 X |
| 4,438,322 | 3/1984 | Sylvia | 219/236 |
| 4,544,829 | 10/1985 | Adachi et al. | 219/238 X |
| 4,752,670 | 6/1988 | Traub et al. | 219/241 X |

Primary Examiner—George H. Miller, Jr.
Attorney, Agent, or Firm—Bernard L. Kleinke; William Patrick Waters; Jerry R. Potts

[57] ABSTRACT

A soldering apparatus includes a holding device, which is composed of a ceramic material and fits over and covers partially, a thermod having an electrically grounded conductor portion to distribute heat uniformly to a soldering surface. The soldering apparatus is moved so that the thermod engages the surface to be soldered. Thermal energies are then uniformly transferred by the thermod to heat the connecting joint to soldering temperature and for heating a solder bead for soldering purposes. After soldering, the apparatus is retracted, or the current is turned off, to permit the surface to cool.

20 Claims, 1 Drawing Sheet

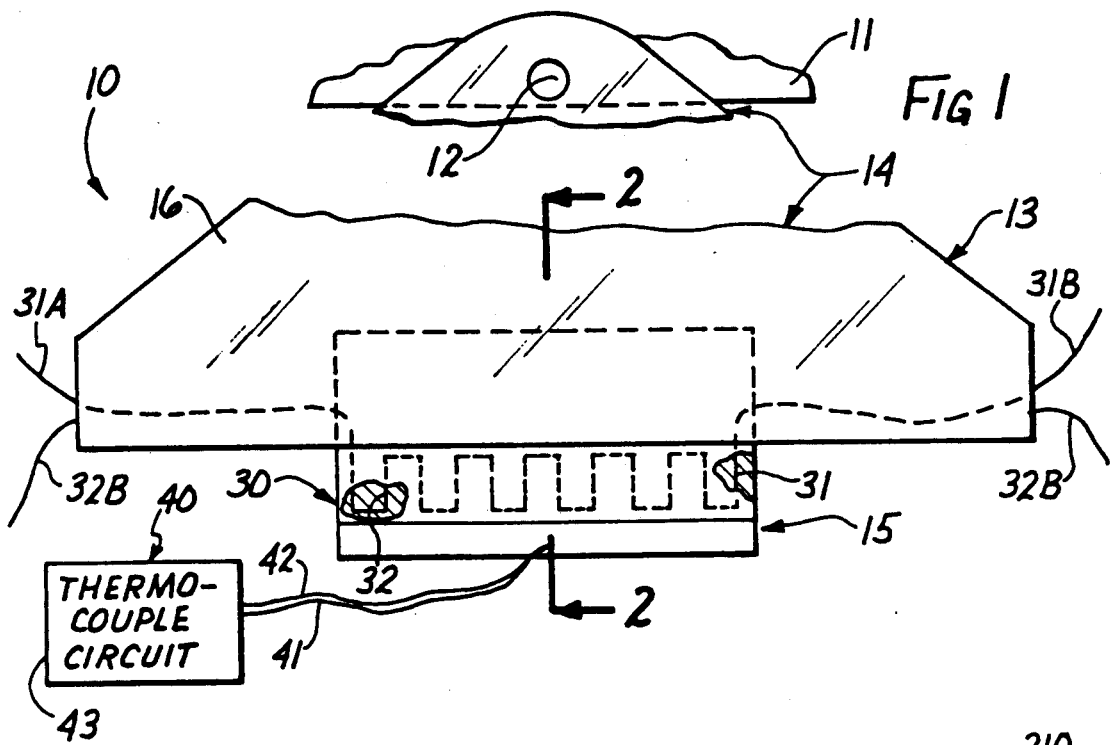
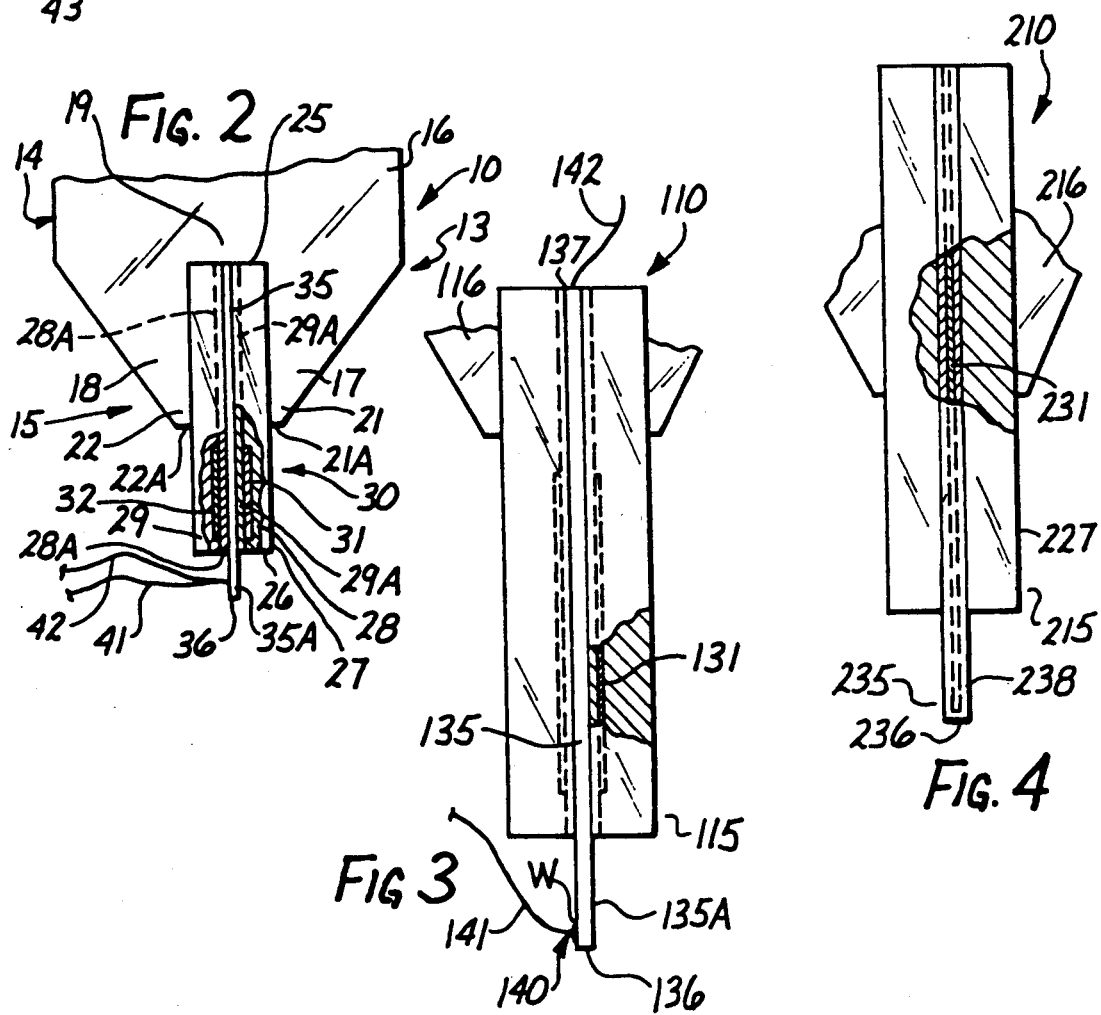

SOLDERING APPARATUS AND METHOD OF USING THE SAME

DESCRIPTION

1. Technical Field

This invention relates to the general field of a soldering apparatus and a method for using it. More particularly, the present invention relates to soldering apparatus and a method for soldering conductors in a more efficient and reliable manner.

2. Background Art

Conventional soldering techniques, such as those used in soldering components to integrated circuit boards, includes the use of a solder head having a hot bar, which is heated to a sufficiently high temperature to reflow soldering material. The solder head includes a thermod for heating the unit. Other conventional techniques include delivering hot-air under pressure for reflow soldering purposes.

While prior known devices and methods may have been successful for some applications, it has been difficult, if not impossible, to solder certain integrated circuit conductors, because they become susceptible to damage by electrical currents used for heating purposes. More particularly, when the conductor leads of an integrated circuit are soldered to the connectors of a printed circuit board by utilizing the hot bar technique, an undesired and unwanted voltage drop occurs across the thermod in direct contact with the component leads. This voltage drop is both undesired and unwanted, as it can result in a current flow that damages or destroys the integrated circuit.

Thus, several conventional soldering heads and techniques for using them have been developed in an attempt to reduce or eliminate the undesired voltage drop across the component leads during the soldering operation. One such attempted apparatus and technique includes using a folded tip thermod bar so the developed current flows across the width of the bar in an attempt to reduce the unwanted voltage drop. While such an attempt could reduce the voltage drop, it has proven to be less than totally satisfactory, in that while it does lower the resistance over the components being soldered, it still, however, causes a sufficiently destructive voltage drop.

Moreover, the prior known folded tip apparatus and technique has caused other problems. More particularly, utilizing a folded tip results in an uneven current flow pattern through the thermod. Such an uneven current flow makes it difficult, if not impossible, to obtain uniform heating of the solder material. Such non-uniform heating of the solder material can result in an undesirable solder joint. Also, whenever a longer hot bar is required, it is even more difficult to provide uniform heating. Therefore, manufacturing costs for the longer thermods are prohibitively high for some applications, thereby limiting their cost effectiveness. For example, it has not proven entirely cost effective to utilize a folded tip thermod to solder a large number of leads simultaneously.

Another problem associated with the folded tip technique is that it is difficult, if not impossible, to make the bottom edge of the thermod sufficiently flat, due to its lack of rigidity. As a result, the bottom surface of the thermod does not properly engage the leads to be soldered, and thus it can not be used for some applications for soldering small leads having a limited tolerance, such, for example, as about 0.001 inches or less.

Therefore, it would be highly desirable to have soldering apparatus and method of using it, for overcoming the problem associated with the voltage drop across the thermod in direct contact with the component leads. Such an improved soldering apparatus and method of using it, should greatly reduce, if not eliminate entirely, undesirable and destructive voltage drops, in order to protect the integrated circuit.

Also, such an improved soldering apparatus should comply with the United States government standard, such as a Department of Defense regulation, identified as DOD-STD-2000, which contains provisions limiting the voltage drop at a thermod tip to only two millivolts for protection of circuits intended for use in military applications.

It would also be desirable to have a soldering apparatus adapted to maintain substantially constant and uniform heating across its entire soldering surface to enable complete and effective engagement with the leads of the components being soldered. In this regard, such an improved apparatus should maintain a coplanar tolerance of 0.001 inches or less.

Another problem associated with conventional apparatus and techniques for single component reflow soldering is misalignment of the hot bar, due to the thermal expansions of the solder head, during the soldering operation. Such thermal expansion not only causes unwanted and undesired misalignment, but also it results in excessive temperature variations, joint-to-joint depending on the coplanarity between the joint to be soldered and the hot bar used to solder the joints. More particularly, a non-coplanar joint does not allow proper fillets to form, or alternately, may cause trapped voids. Thus, conventional soldering apparatus has not been successful in attempting to eliminate the undesired and unwanted misalignment of the hot bar relative to the soldering surface.

One such attempted technique includes using a strip of conductor ribbon supported at the ends. The support is either a welded post or wider sections of the material used for the thermod. The rods or material at the thermod ends have a heat sinking effect, thereby conducting away the heat generated, thus making the temperature of the bar ends cooler. While such an attempt tends to cool the bar ends, it has proven to be less than totally satisfactory as it has caused other problems. In this regard, the thermod has no support at its central portion, which lack of support results in the center portion of the thermod being bowed or deflected. Such deflection causes cold solder joints at the end portion of the thermod and over heating joints at its central portion. Such overheating may cause the signal traces connected to the component leads to be lifted from the printed circuit board. Also, thermods structured in this manner having greater widths, have a tendency to move in a snake-like manner during heating, because of thermal expansion. Such movement results in undesired and unwanted pressure changes on the leads being soldered.

Therefore, it would be highly desirable to have a soldering apparatus and method of using it for overcoming the problems associated with misalignment of the hot bar due to thermal expansion. Such soldering apparatus and method of using it, should greatly reduce, if not eliminate entirely, unwanted and undesired movement and misalignment by maintaining a substantially constant temperature differential across the hot bar.

Another problem associated with conventional soldering apparatus is that, in certain situations, a holding fixture (under the hot bar) is required to hold the component leads in proper alignment with the hot bar during the soldering process. The holding fixture, however, creates two additional thermal barriers between the soldering head and the solder joint. Moreover, the material used for the holding fixture has certain thermal characteristics, tending to increase the time of heating and to inhibit uniform heat flow across the soldering surface. As a result of such variations, pressure variations occur on the holding bar during the soldering and cooling steps of the soldering process. Such pressures or forces, therefore, can cause the change in the position of the component leads, resulting in an improper solder joint.

Also, with respect to the utilization of a holding fixture, it is conventional for the hot bar to be partially retracted after soldering, while the holding fixture remains in contact with the soldered joint during the cooling process. However, the extra thermal mass of the holding fixture, being disposed in close proximity to the hot bar, requires that the holding fixture be force cooled by blowing air onto both the holding fixture and the joint. This forced cooling can solidify the outside of the solder joint, while the inside remains hot. This, in turn, can create unwanted and undesired solder joint stress during the cooling process.

Therefore, it would be highly desirable to have a soldering apparatus and method of using it for overcoming the problem associated with excessive heat being transferred from the thermod to the holding fixture. Such a soldering apparatus and method of using it should greatly reduce, if not entirely eliminate, unwanted and undesired heat transfer to an associated holding fixture so that air cooling of the fixture would not be required.

DISCLOSURE OF INVENTION

Therefore, it is the principal object of the present invention to provide a new and improved soldering apparatus and method of using it, to solder surfaces in a convenient and efficient manner, while reducing or substantially eliminating unwanted and undesired voltage drops developing across the surface being soldered.

Another object of the present invention is to provide such a new and improved soldering apparatus, which maintains a substantially even soldering temperature across its soldering member, and which properly and substantially completely engages the surface to be soldered to maintain a desirable coplanar tolerance.

Another object of the present invention is to provide a new and improved soldering apparatus and method of using it, to reduce greatly, if not eliminate entirely, undesirable misalignment of the soldering apparatus due to thermal expansion.

Yet another object of the present invention is to provide a new and improved soldering apparatus, which reduces, if not entirely eliminates, unwanted heat transfer to an associated holding fixture, so that cooling of the holding fixture is not required.

A further object of the present invention is to provide such a new and improved soldering apparatus and method of using it in a highly efficient manner, with a relatively inexpensive to manufacture apparatus.

Briefly, the above and further objects of the present invention are realized by providing a new and improved soldering apparatus and a method of using it, to overcome all of the foregoing problems, in a relatively inexpensive and highly reliable manner.

The soldering apparatus includes a holding block, which is composed of ceramic material and fits over and supports a thermod, which is used to apply heat to the solder connection. A conducting member transfers thermal energy from the thermod to a solder joint or connection. The holding block serves as a spacing device for isolating electrically the thermod from the conducting member to inhibit electrical current from flowing in the conducting member.

Such a mounting head could be associated with a reflow solder system, such as the one disclosed in pending U.S. patent application Ser. No. 07/102,478, filed on Sept. 29, 1987, entitled "Solder System and Method of Using Same". The disclosure of said pending application is incorporated herein by reference, and is made a part hereof.

The inventive method of using the soldering apparatus includes moving the mounting head until the tip portion of the thermod engages the joint to be soldered. Thermal energies are then uniformly transferred by the thermod to heat the connecting joint to a soldering temperature, and for heating a solder bead for soldering purposes. After soldering, the current flow is interrupted, or the mounting head is retracted to permit the solder joint or connection to cool.

By employing the spacing device in the form of a ceramic block, electrical current is not permitted to be transferred from the conducting member to the valuable components being connected electrically, thereby protecting them from damage by the electrical currents. On the other hand, the ceramic block does permit the heat to be conveyed to the conducting member for efficient and effective soldering operations.

BRIEF DESCRIPTION OF DRAWINGS

The above mentioned and other objects and features of the present invention and the manner of attaining them will become apparent, and the invention itself will be best understood by reference to the following description of the embodiment of the invention in conjunction with the accompanying drawings, wherein:

FIG. 1 is a partly diagrammatic, fragmentary, elevational view of soldering apparatus, which is constructed in accordance with the present invention;

FIG. 2 is a sectional view of the soldering apparatus of FIG. 1, taken substantially on line 2—2 thereof;

FIG. 3 is a side elevational view of another soldering apparatus, which is also constructed in accordance with the present invention; and FIG. 4 is a side elevational view of yet another soldering apparatus, which is also constructed in accordance with the present invention.

BEST MODE FOR CARRYING OUT THE INVENTION

Referring now to the drawings, and more particularly to FIG. 1 thereof, there is shown a soldering apparatus 10, which is constructed in accordance with the present invention, and which includes a soldering head 13 attached by a gimbal arrangement at 12, to a reflow solder machine 11, such as the one shown and described in the foregoing mentioned pending patent application.

The soldering apparatus 10 generally comprises the soldering head 13 and a thermocouple circuit 43. The head 13 includes a holding member 14, which is adapted to be supported from above and form a part of the machine 11. The holding member 14 fits over and supports a thermod 15 used to supply heat for the soldering operation.

In operation, the soldering head 13 is moved downwardly by the reflow solder machine 11 until the thermod 15 makes contact with a solder surface, such as a joint or connection (not shown). Thermal energy is then transferred to the surface to be soldered by the thermod 15 to heat the surface to a soldering temperature for, in turn, heating a solder bead (not shown) for soldering purposes, to connect the leads or conductors of a first member (not shown) to the terminals or conductors of a second member (not shown). After soldering, the soldering head 13 is retracted, or the current is turned off, to allow the joint to cool.

Considering now the holding member 14 in greater detail with reference to FIGS. 1 and 2, the holding member 14 includes an elongated substantially triangularly shaped holding block 16 for receiving partially and for engaging securely the thermod 15, which depends from the bottom edge thereof. The holding block 16 includes at the bottom edge thereof a pair of spaced-apart leg portions 17 and 18, and an interconnecting bight portion 19, forming a groove 25 receiving the upper portion of the thermod 15.

For the purpose of thermally and electrically insulating the thermod 15 from the head 13, the holding block 16 is composed of a ceramic material, which is both an electrical and a thermal insulator. In the preferred form of the invention, the ceramic material is aluminum silicate. It should be understood, however, that other ceramic materials may be employed. For example, alumina, magnesium oxide and porcelain are also suitable.

By utilizing the above mentioned ceramic material, the block 16 of the holding member 14 electrically isolates the thermod 15 from the mounting head 13 of the reflow solder machine 11. In addition, by utilizing a heat insulating ceramic material in the holding block 16, the heat generated by the thermod 15 is substantially confined to the thermod 15, thereby improving the overall thermal efficiency of the soldering head 13 of the apparatus 10.

As best seen in FIG. 2, the leg portions 17 and 18 of the holding block 16 are complementarily shaped and dimensioned to engage and partially cover the thermod 15, which is secured with the groove 25 by any suitable technique such as bonding. For facilitating the proper engagement of the thermod 15, the leg portions 17 and 18 include inwardly tapered lower ends 21 and 22, terminating in flattened edges 21A and 22A. The groove 25 opens downwardly and extends longitudinally substantially throughout the entire axial length of the block 16. The groove 25 is dimensioned to receive the thermod 15.

Also as best seen in FIG. 2, the holding block 16 does not completely cover the thermod 15. It should be understood that the thermod 15 may vary in size and shape depending on the specific soldering application in which the thermod is utilized. Accordingly, the holding block 16 may also be varied in size and shape and can extend downwardly covering a greater portion of the thermod.

Considering now the thermod 15 in greater detail with reference to FIGS. 1 and 2, the thermod 15 generally comprises a conductor member 35 that is substantially surrounded by a ceramic block device generally indicated at 27 and has a depending bottom exposed edge portion 35A. The ceramic block device 27 has right and left outer block portions 28 and 29, and inner block portions 28A and 29A, each of which is generally uniform in cross section throughout its lengths and extends along opposite faces of the flat conductor member 35. The heating elements 31 and 32 are each sandwiched between the respective inner and outer block portions 28, 28A and 29, 29A. The blocks 29 and 29A are thinner, and are disposed between the central conductor member 35 and the elements 31 and 32. The upper portion of the ceramic block device 27 is adapted to be removably secured within the groove 25 of the holding member 14.

The outer block portions 28 and 29 are composed of heat and electrical insulating material to help confine the heat flowing from the heating elements to the central conductor member 35. Since the material is also an electrical insulator, the thermod 15 is electrically insulated from the member 16 and the machine 11.

The inner block portions 28A and 29A are composed of electrical insulating material to help prevent electrical current flow being established in the central conductor 35. The material of the block portions is a heat conductor to facilitate the transfer of heat from the heating elements to the central conductor member 35.

In the preferred form of the invention, the inner block portions 28A and 29A is composed of beryllium oxide, which is an excellent heat conductor, as well as an electric insulator. Although beryllium oxide is the preferred ceramic material, it should be understood that other ceramic materials may also be employed. For example, aluminum nitride, boron nitride, and beryllia may also be utilized.

For the purpose of converting electrical energy to thermal energy the thermod 15 also includes an electrical heating device generally indicated at 30. The heat device 30 includes a pair of electrical heating elements or conductors 31 and 32, each configured in a Greek serpentine pattern. The elements 31 and 32 have pairs of end portions 31A, B and 32A, B, which are coupled to an electrical power source (not shown) for energizing electrically the elements 31 and 32 to heat the member 35.

In the preferred form of the invention, the elements 31 and 32 are composed of NICKROTHAL, which is a nickel/chromium alloy, an electrical conductor. Although NICKROTHAL is the preferred material, it should be understood that other metallic or ceramic materials may also be employed For example, MOLYBDENUM DISILICIDE, SILICON CARBIDE, CERMET, TITANIA, ZIRCONIA, SILICON NITRIDE, CARBON, CARBON ALLOYS, GRAPHITE, ALCROTHAL, KANTHAL, and TITANIUM CARBIDE may also be utilized.

As best seen in FIGS. 1 and 2, the heating elements 31 and 32 are respectively disposed in the right and left block portions 28, 28A and 29, 29A of the block 27 adjacent to the conductor 35. Although the preferred form of the invention utilizes a pair of elements or conductors each having a Greek serpentine pattern, it should be understood that other heating element configurations and devices may also be utilized. For example, spaced apart ribbon strips or helix coils such as bifilar windings for cancelling magnetic fields, may also be employed.

As best seen in FIGS. 1 and 2, the conductor member 35 is centrally disposed or sandwiched between the block portions 28A and 29A of the block 27 between the heating elements 31 and 32 for transferring thermal energy thereto. The conductor 35 has a bottom edge portion 36 for applying heat to the surface to be soldered.

The conductor member 35 is in the form of a plate for conducting the thermal heat radiated by the elements 31 and 32 and is comprised of a suitable heat conducting material such as SILICON CARBIDE, which is an excellent heat conductor. The bottom edge portion 36 of the conductor 35 may be structured in a number of different configurations depending on the type of solder joints or connections to be soldered.

Although the preferred form of the present invention utilizes a ceramic member, the conductor 35 may be composed of other metallic or ceramic materials, which are suitable thermal conductors. For example, metallic aluminum, copper, tellurium copper, plated copper, tin, SILVER, TUNGSTEN, ferritic alloys, titanium, nickel alloys, molybdenum, copper clad-iron, lead copper invar, stainless steel, (ceramic) aluminum nitride, silicon nitride, boron nitride, TUNGSTEN CARBIDE, BARYLLIUM OXIDE, and silicon carbide may also be employed.

When the heating elements 31 and 32 are energized electrically by the electrical source, the heat generated is absorbed by the central conductor member 35. The heat absorbed by the conductor 35 is then be transferred to a surface to be soldered. The ceramic blocks 28A and 29A serve as spacing devices to isolate electrically the heating elements 31 and 32 from the conductor member 35. In this manner, the conductor member 35 is able to be heated to soldering temperatures by thermal conduction, without electrical current flow through the conductor member 35 to protect the circuit components and the like.

For the purpose of controlling the temperature of the conductor 35, the thermocouple 40 may be connected to the thermod 15. The thermocouple 40 includes a pair of conductors 41 and 42, which have their ends attached to the central portion of the bottom portion 35A of the conductor member 35 to form a pair of dissimilar conductors connected electrically to the member 35. In this manner, when the bottom portion 35A of the conductor is heated, the dissimilarity between the conductors 41 and 42 produces a small thermoelectric current, which is detected by a thermocouple circuit 43 for the purpose of controlling the temperature signal generated by the circuit 43 can be used to control the temperature of the conductor 35. In this manner, a direct response is achieved when temperature variation arise.

Referring now to FIG. 3, there is shown another soldering apparatus 110, which is also constructed in accordance with the present invention and which has a different thermocouple arrangement. Soldering apparatus 110 is substantially similar to the solder apparatus 10, and includes a ceramic thermod 115 and a mounting block 116. The thermod 115 and the mounting block 116 are substantially similar to thermod 15 and mounting block 16 of FIG. 1. Thermod 115 includes a conductor member 135 for transferring thermal energy to a surface (not shown) to be soldered, and is similar to conductor member 35, of FIG. 1.

For the purpose of controlling the temperature of the conductor member 135, a thermocouple 140 may be connected to the thermod 115 in a similar manner as the conductors 41 and 42 of FIG. 1, by means of a weld W. The thermocouple 140 includes a pair of conductors 141 and 142. The conductors 141 and 142 are spot welded to a bottom edge portion 135A and a top edge 137 of the conductor member 135 to form a pair of dissimilar conductors joined in series to form a closed circuit. It should be understood the dissimilar conductors consist of the conductor 141 and the metallic conductor 135 itself. In this manner, when the bottom portion 135A of the conductor is heated, the dissimilarity between the conductors 135 and 141 produce a small thermoelectrical current that may be easily and conveniently measured by a thermal couple circuit (not shown), such as circuit 43 of FIG. 1, for the purpose of controlling the temperature of conductor 135.

Referring now to FIG. 4, there is shown yet another soldering apparatus 210, which is also constructed in accordance with the present invention, and which has a different heating element arrangement. Soldering apparatus 210 is similar to solder apparatus 10 and includes a ceramic thermod 215 and a ceramic mounting block 216. The mounting block 216 is similar to mounting block 16.

Considering now thermod 215 in greater detail with reference to FIG. 4, the thermod 215 generally comprises a conductor member 235 that is substantially surrounded by a ceramic block 227. In the preferred form of the invention, the ceramic block 227 is composed of a ceramic material, such as ALUMINUM SILICATE, that is both a thermal and electrical insulator. Although ALUMINUM SILICATE is the preferred ceramic material, it should be understood that other ceramic materials, such as PORCELAIN, alumina, magnesium oxide and MULLITE, may also be utilized.

Considering now the conductor member 235 in greater detail, conductor member 235 consists of an electrical heating element or conductor 231 coupled to an electrical source (not shown) for enabling the conductor or heating element 231 to be rapidly energized electrically. The heat conductor member 235 is also an electrical insulator, which completely surrounds the heating element 231.

The conductor 231 consists of any suitable material that will conduct electrical current and that is rapidly heated by said conductor. In the preferred form of the invention, the conductor 231 is composed of silicon carbide, which is both a suitable heat conductor as well as an electrical conductor. Although silicon carbide is the preferred material, it should be understood that other ceramic materials, such as molybdenum disilicide and CERMET, TITANIA, ZIRCONIA, titanium carbide, SILICON, NITRIDE, CARBON, CARBON ALLOYS, GRAPHITE, and metallic such as KANTHAL, ALCROTHAL, NICKROTHAL, and metallic alloy materials may be utilized.

Insulator 236 consists of any suitable material that electrically isolates the electrical heat conductor 231 from the outer surface 238 of the conductor 235, and yet transfers the thermal energy produced by the heating of the conductor 231. In the preferred form of the invention, the insulator is composed of aluminum nitride, which is a suitable heat conductor, as well as an electrical insulator. Although aluminum nitride is the preferred ceramic material, it should be understood that other ceramic materials, such as silicon nitride, beryllium oxide, boron nitride, alumina, beryllia, and silicon carbide may be utilized.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A soldering apparatus including a soldering head, comprising:
   thermod means for heating uniformly a solder material to form a substantially uniform solder joint;
   said thermod means including conductor means for transferring thermal energy to said solder material, said conductor means being generally a thin flat elongated plate composed of a thermally conductive electrically insulative material;
   said thermod means including a pair of first and second heating elements for converting electrical energy to thermal energy to heat said plate to soldering temperatures;
   said heating elements being disposed on opposite sides of said flat plate at a substantial distance from the bottom edge thereof;
   said thermod means further including a pair of first and second elongated spacing members, each one being interposed between said plate and one of respective first and second heating elements for isolating electrically said heating elements from said plate to inhibit electrical current from flowing in said plate and for permitting heat flow from said heating elements to said plate;
   said thermod means further including a pair of first and second heat confining elongated members for directing the thermal energy generated by said heating elements toward said plate, said heat confining members being composed of a thermally and electrically non-conductive material;
   said first and second heat confining elongated members being spaced apart on opposite sides of said plate engaging the respective first and second heating elements for directing the thermal energy generated thereby toward said plate;
   said plate depending downwardly between said first and second spacing members terminating in a bottom edge having a substantially flat surface throughout its entire longitudinal length for transferring uniformly thermal energy to said solder material;
   holding means disposed in a spaced apart manner relative to said conductor means for securing the conductor means and the heating means relative to the soldering head and for thermally insulating the soldering head from said heating means and said conductor means;
   wherein said holding means includes insulating means for electrically and thermally insulating said thermod means from the soldering head;
   said insulating means including means for securing said thermod means to the soldering head; and
   said insulating means being an elongated block member for receiving a portion of said thermod means.

2. Soldering apparatus according to claim 1, wherein said conductor means is composed of a ceramic material.

3. Soldering apparatus according to claim 2, wherein the ceramic material is selected from the group consisting of aluminum oxide, silicon nitride, boron nitride, alumina, silicon carbide, ALUMINUM NITRIDE, TUNGSTEN CARBIDE, BERYLLIUM OXIDE, and TITANIUM DIBORIDE.

4. Soldering apparatus according to claim 1, wherein said conductor means is composed of a metallic material.

5. Soldering apparatus according to claim 4, wherein the metallic material is selected from the group consisting of titanium, aluminum, lead copper, silver, tungsten, copper, copper-clad iron, invar, stainless steel, NICKROTHAL, KANTHAL, ALCROTHAL, or alloys containing nickel and chromium, ferritic alloy, CERMET, carbon or carbon alloy, graphite, tin, nickel or alloys thereof and molybdenum.

6. Soldering apparatus according to claim 1, wherein said conductor means is a bar having a soldering surface thereon for transferring thermal energy to heat a surface to soldering temperatures.

7. Soldering apparatus according to claim 1, wherein said heating means is composed of a ceramic material.

8. Soldering apparatus according to claim 7, wherein the ceramic material is selected from the group consisting of silicon nitride, CERMET, TITANIA, ZIRCONIA, MOLYBDENUM DISILICIDE, TITANIUM CARBIDE, and silicon carbide.

9. Soldering apparatus according to claim 1, wherein said heating means is composed of a metallic material.

10. Soldering apparatus according to claim 9, wherein said metallic material is selected from the group consisting of titanium, TUNGSTEN, aluminum, silver, copper, copper-clad iron, lead copper, invar, stainless steel, NICKROTHAL, KANTHAL, ALCROTHAL, or alloys containing nickel and chromium ferritic alloy, CERMET, carbon or carbon alloy, graphite, tin, nickel or alloys thereof and molybdenum.

11. Soldering apparatus according to claim 1, wherein said spacing means is a ceramic material interposed between said conductor means and said heating means.

12. Soldering apparatus according to claim 11, wherein said ceramic material is selected from the group consisting of ALUMINUM NITRIDE, aluminum oxide, boron nitride, BERYLLIUM OXIDE, BERYLLIA, alumina, and silicon carbide.

13. Soldering apparatus according to claim 11, wherein said ceramic material is a heat conductor.

14. Soldering apparatus according to claim 13, wherein said ceramic material is further an electrical insulating material.

15. In a reflow solder system used for soldering purposes, a soldering head attached to a reflow soldering machine, comprising:
   thermod means for heating uniformly a solder material to form a solder joint;
   insulating means for electrically and thermally isolating the thermod means from the soldering head;
   said insulating means including means for securing said thermod means to the soldering head;
   said insulating means being a generally triangularly shaped elongated block having a pair of spaced-apart complementarily shaped leg portions forming a groove for receiving a portion of said thermod means;
   said thermod means including conductor means for transferring thermal energy to said solder material, said conductor means being generally a thin flat elongated plate composed of a thermally conductive electrically insulative material;
   said thermod means including a pair of first and second heating elements for converting electrical energy to thermal energy to heat said plate to soldering temperatures;

said heating means being disposed on opposite sides of said flat plate at a substantial distance from the bottom edge thereof;

said thermod means further including a pair of first and second elongated spacing members each one being interposed between said plate and one of said respective first and second heating elements for isolating electrically said heating elements from said plate to inhibit electrical current from flowing in said plate and for permitting heat flow from said heating elements to said plate;

said thermod means further including a pair of first and second heat confining elongated members for directing the thermal energy generated by said heating elements toward said plate, said heating confining members being composed of a thermally and electrically non conductive material;

said first and second heat confining elongated members being spaced apart on opposite sides of said plate engaging the respective first and second heating elements for directing the thermal energy generated thereby toward said plate; and said plate depending downwardly between said first and second spacing members terminating in a bottom edge having a substantially flat surface throughout its entire longitudinal length for transferring uniformly thermal energy to said solder material.

16. The system according to claim 15, further comprising:

holding means disposed in a spaced apart manner relative to said conductor means for securing the conductor means and the heating means relative to a mounting head and for thermally insulating the mounting head from said heating means and said conductor means.

17. The system according to claim 16, further comprising:

means for measuring the temperature of said conductor.

18. The system according to claim 17, wherein said means for measuring the temperature of said conductor is a thermocouple.

19. The system according to claim 18, wherein said thermocouple comprises:

a pair of dissimilar conductors joined in series to form a closed circuit so as to produce a thermoelectric current when heated.

20. The system according to claim 15, wherein said spacing means is composed of a block of ceramic material having a right and left portion, said portions being separated by said conductor means.

* * * * *